(12) United States Patent
Su et al.

(10) Patent No.: US 11,985,654 B2
(45) Date of Patent: May 14, 2024

(54) DATA TRANSMISSION METHOD, TERMINAL, AND NETWORK DEVICE

(71) Applicant: DATANG MOBILE COMMUNICATIONS EQUIPMENT CO., LTD., Beijing (CN)

(72) Inventors: Xin Su, Beijing (CN); Runhua Chen, Beijing (CN); Qiubin Gao, Beijing (CN); Qiuping Huang, Beijing (CN); Deshan Miao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 612 days.

(21) Appl. No.: 17/267,092

(22) PCT Filed: Jul. 29, 2019

(86) PCT No.: PCT/CN2019/098112
§ 371 (c)(1),
(2) Date: Feb. 9, 2021

(87) PCT Pub. No.: WO2020/034831
PCT Pub. Date: Feb. 20, 2020

(65) Prior Publication Data
US 2021/0168839 A1    Jun. 3, 2021

(30) Foreign Application Priority Data
Aug. 17, 2018   (CN) .......................... 201810942311.8

(51) Int. Cl.
*H04W 72/12* (2023.01)
*H04B 7/0417* (2017.01)
(Continued)

(52) U.S. Cl.
CPC ...... *H04W 72/1268* (2013.01); *H04B 7/0417* (2013.01); *H04B 7/0626* (2013.01); *H04W 72/23* (2023.01)

(58) Field of Classification Search
CPC ............. H04W 72/1268; H04W 72/23; H04W 72/046; H04W 72/542; H04B 7/0417;
(Continued)

(56) References Cited

U.S. PATENT DOCUMENTS

2011/0103510 A1   5/2011  Gaal et al.
2018/0062724 A1   3/2018  Onggosanusi et al.
(Continued)

FOREIGN PATENT DOCUMENTS

CN   108288983 A   7/2018
EP   3327945 A1    5/2018
(Continued)

OTHER PUBLICATIONS

Japanese Office Action dated Apr. 26, 2022 for Japanese Patent Application No. 2021-507629.
(Continued)

*Primary Examiner* — Candal Elpenord
(74) *Attorney, Agent, or Firm* — Harness, Dickey & Pierce, P.L.C.

(57) ABSTRACT

A data transmission method, a terminal, and a network device are provided. The transmission method includes receiving physical uplink shared channel PUSCH scheduling information sent by a network device, wherein the PUSCH scheduling information includes first indication information and second indication information, and the first indication information is used to indicate a data layer comprised in a PUSCH, the second indication information is used to indicate a precoding matrix; mapping, according to the precoding matrix indicated by the second indication
(Continued)

information, the data layer included in the PUSCH onto at least two target antenna panels for transmission, wherein the target antenna panels are antenna panels, for transmitting the PUSCH, among the at least two antenna panels of the terminal.

16 Claims, 7 Drawing Sheets

(51) Int. Cl.
    *H04B 7/06*         (2006.01)
    *H04W 72/1268*    (2023.01)
    *H04W 72/23*      (2023.01)

(58) Field of Classification Search
    CPC ............... H04B 7/0626; H04B 7/0695; H04B 7/06966; H04B 7/0691; H04B 7/0456; H04B 7/0408; H04B 7/0617; H04B 7/0682; H04L 5/0023; H04L 5/0044; H04L 5/0048; H04L 5/0053; H04L 5/0057
    USPC .................................................. 370/329–330
    See application file for complete search history.

(56) References Cited

U.S. PATENT DOCUMENTS

| | | | |
|---|---|---|---|
| 2018/0183503 A1 | 6/2018 | Rahman et al. | |
| 2018/0213484 A1* | 7/2018 | Oh | H04W 52/42 |
| 2019/0044599 A1* | 2/2019 | Kakishima | H04B 17/327 |
| 2019/0140729 A1* | 5/2019 | Zhang | H04W 52/16 |
| 2019/0173553 A1 | 6/2019 | Park et al. | |
| 2019/0200249 A1 | 6/2019 | Yoon et al. | |
| 2019/0363760 A1 | 11/2019 | Wu et al. | |
| 2020/0162133 A1 | 5/2020 | Harrison et al. | |
| 2020/0275260 A1 | 8/2020 | Huang et al. | |
| 2020/0382177 A1* | 12/2020 | Lee | H04B 7/0456 |
| 2021/0068142 A1* | 3/2021 | Park | H04B 7/0456 |
| 2021/0345253 A1* | 11/2021 | Matsumura | H04W 52/262 |

FOREIGN PATENT DOCUMENTS

| | | |
|---|---|---|
| JP | 2012525089 A | 10/2012 |
| JP | 2019537385 A | 12/2019 |
| JP | 2020516096 A | 5/2020 |
| JP | 2020523912 A | 8/2020 |
| JP | 2020536413 A | 12/2020 |
| WO | WO-2018/021865 A1 | 2/2018 |
| WO | WO-2018/117738 A1 | 6/2018 |
| WO | WO-2018/231141 A1 | 12/2018 |

OTHER PUBLICATIONS

ZTE, SANECHIPS, "Remaining details on codebook based UL transmission", Agenda item 7.2.1.2, 3GPP TSG RAN WG1 Meeting 91, R1-1719527, Nov. 27-Dec. 1, 2017, Reno, USA.
Nokia, Nokia Shanghai Bell, "Remaining issues on reference signals and QCL", Agenda Item 7.1.2.4, 3GPP TSG RAN WG1 Meeting #94, R1-1809238, Aug. 20-24, 2018 Gothenburg, Sweden.
Korean Office Action dated Jul. 7, 2018 for KR Patent Application No. 10-2021-7007818.
3GPP-TS-38-211-V15-2-0—3rd Generation Partnership Project; Technical Specificatoin Group Radio Access Network; NR; Physical channels and modulation (Release 15) Jun. 2018.
ZTE, SANECHIPS, "Details of UL beam management", Agenda item 6.2.2.6, 3GPP TSG RAN WG1 Meeting 90bis, R1-1717430, Oct. 9-13, 2017, Prague, CZ.
Extended European Search Report dated Aug. 3, 2021 for Application No. EP 19 84 9442.
Spreadtrum Communications, "Consideration on UL diversity transmission", Agenda Item 6.2.1.4, 3GPP TSG RAN WG1 Meeting NR#3, R1-1715516, Sep. 18-21, 2017, Nagoya, Japan.
Huawei, Hisilicon, "Codebook based transmission for UL MIMO", Agenda item 7.2.1.2, 3GPP TSG RAN WG1 Meeting #90bis, R1-1718237, Oct. 9-13, 2017, Prague, Czech Republic.
Samsung, "Codebook-based UL transmission", Agenda item 7.2.1. 2, 3GPP TSG RAN WG1 Meeting #91, R1-1721399, Nov. 1, 2017, Reno, USA.
Huawei, Hisilicon, "Codebook based transmission for UL MIMO", Agenda Item 5.1.2.1.2, 3GPP TSG RAN WG1 NR Ad Hoc Meeting, R1-1710447, Qingdao, China, Jun. 27-30, 2017.
Intel Corporation, "Remaining issues on CSI reporting", Agenda item 6.2.2.2, 3GPP TSG RAN WG1 NR Ad-Hoc#3, R1-1716293, Nagoya, Japan, Sep. 18-21, 2017.
Written Opinion and International Search Report for International Application No. PCT/CN2019/098112 dated Feb. 23, 2021.
3GPP TS 38.214 V15.2.0 (Jun. 2018), 3rd Generation Partnership Project; Technical Specification Group Radio Access Network; NR; Physical layer procedures for data (Release 15).
Taiwanese Office Action for Application No. 108128226 dated May 11, 2020.

* cited by examiner

DATA TRANSMISSION METHOD, TERMINAL, AND NETWORK DEVICE

CROSS-REFERENCE TO RELATED APPLICATIONS

This application is a U.S. national phase application of a PCT Application No. PCT/CN2019/098112 filed on Jul. 29, 2019, which claims a priority to Chinese Patent Application No. 201810942311.8 filed in China on Aug. 17, 2018, the disclosures of which are incorporated in their entirety by reference herein.

TECHNICAL FIELD

The present disclosure relates to the field of communications application, in particular, relates to a data transmission method, a terminal and a network device.

BACKGROUND

A user equipment (User Equipment, UE) or a terminal equipped with a plurality of transmitting antennas in the related art can perform uplink beamforming. In order to determine an uplink (UL) beamforming matrix, a UE in a Radio Resource Control Connected (RRC_CONNECTED) state may be semi-statically configured with a plurality of UE-specific uplink sounding reference signal (Sounding Reference Signal, SRS) resources. SRS signals transmitted on each SRS resource are beamformed using a specific beamforming matrix. The UE transmits these SRS resources in uplink. A transmission and reception point (TRP) measures signal qualities of different SRS resources and selects a preferred SRS resource. The TRP transmits an index (an SRS resource indicator (SRI)) of the selected SRS resource to the UE via Downlink Control Information (DCI). From the SRI, the UE can infer which uplink beamforming matrix (e.g., a SRS resource) is recommended by the TRP for future uplink transmission. The UE may then use, for future uplink transmissions, the uplink beamforming matrix indicated by the SRI.

The UE may have multiple antenna panels for uplink transmission. Each antenna panel consists of a set of antenna elements. The exact number of the antenna panels, the number of antenna elements, and arrangement of antenna elements within each panel are determined according to particular implementation, and different UEs may have different implementations. The UE may send one data layer at a time from one panel. The UE may also simultaneously send one data layer from a subset of the antenna panels (including more than one antenna panel), the description of which applies equally to SRS resources (transmission of SRS signals). However, a specification in the related art cannot support a joint transmission mode in which physical uplink shared channels (Physical Uplink Shared Channel, PUSCH) are simultaneously transmitted from a multi-antenna panel, resulting in a lower transmission rate.

SUMMARY

An objective of the present disclosure is to provide a data transmission method, a terminal, and a network device, so as to solve the problem that a specification in the related art cannot support parallel transmissions of PUSCH from a plurality of antenna panels.

To achieve the above objective, a data transmission method is provided in the present disclosure. The method is applied to a terminal configured with at least two antenna panels for uplink transmission. The method includes: receiving Physical Uplink Shared Channel (PUSCH) scheduling information sent by a network device, wherein the PUSCH scheduling information includes first indication information and second indication information, and the first indication information is used to indicate a data layer included in a PUSCH, the second indication information is used to indicate a precoding matrix; and mapping, according to the precoding matrix indicated by the second indication information, the data layer included in the PUSCH onto at least two target antenna panels for transmission, wherein the target antenna panels are antenna panels, for transmitting the PUSCH, among the at least two antenna panels of the terminal.

Before receiving the PUSCH scheduling information sent by the network device, the method further includes: transmitting a beam-training signal resource using analog beams on the at least two target antenna panels; acquiring a target transmission beam, indicated by the network device, corresponding to each of the target antenna panels, where the target transmission beam is acquired by the network device according to the beam-training signal resource; transmitting an uplink signal resource, for acquiring channel state information (CSI), on each of the target antenna panels by using a target transmission beam corresponding to the target antenna panel, wherein the PUSCH scheduling information is acquired by the network device according to the uplink signal resource.

The uplink signal resource is an uplink signal resource including K ports, K is a sum of the numbers of digital channels of the at least two target antenna panels, and the K ports are mapped to the at least two target antenna panels, K is a positive integer, and K is greater than or equal to L, and L is the number of data layers included in the PUSCH.

Transmitting the uplink signal resource, for acquiring the CSI, on each of the target antenna panels by using the target transmission beam corresponding to the target antenna panel, includes: determining a first target transmission beam corresponding to a first target port according to correspondence relationship between a port and a target transmission beam indicated by the network device; transmitting an uplink signal resource of the first target port on a first target antenna panel corresponding to the first target transmission beam.

Mapping, according to the precoding matrix indicated by the second indication information, the data layer included in the PUSCH onto the at least two target antenna panels for transmission, includes: performing a precoding operation on L data layers of the PUSCH according to the precoding matrix indicated by the second indication information, to acquire a transmission signal vector including K data layers, wherein, each data layer of the transmission signal vector corresponds to one of the ports; acquiring a second target port corresponding to a target data layer of the transmission signal vector; and transmitting, on a second target antenna panel, the target data layer of the transmission signal vector using a second target transmission beam corresponding to the second target port, wherein the second target antenna panel is an antenna panel having mapping relationship with the second target port.

Transmitting the beam-training signal resource using the analog beams on the at least two target antenna panels, includes: selecting a target beam-training signal resource set corresponding to a third target antenna panel from among beam-training signal resource sets configured by the network device for each of the target antenna panels, wherein each of the beam-training signal resource sets includes at least one beam-training signal resource, the third target antenna panel is any one of the at least two target antenna panels; transmitting beam-training signal resources of the target beam training signal set using different analog beams on the third target antenna panel.

To achieve the above objective, a data transmission method performed by a network device is further provided in the embodiments of the present disclosure. The method includes: acquiring uplink channel state information (CSI) according to an uplink signal resource sent by a terminal; acquiring Physical Uplink Shared Channel (PUSCH) scheduling information according to the channel state information (CSI), and sending the acquired information to a terminal, wherein the PUSCH schedule information includes first indication information and second indication information, the first indication information is used to indicate a data layer included in a PUSCH, and the second indication information is used to indicate a precoding matrix.

Before acquiring the uplink CSI according to the uplink signal resource sent by a terminal, the method further includes: acquiring a beam-training signal resource sent by the terminal using analog beams on at least two target antenna panels; performing a beam-scanning operation on the beam-training signal resource, determining a target transmission beam corresponding to each of the target antenna panels and indicating the target transmission beam to the terminal.

The uplink signal resource is an uplink signal resource including K ports, K is a sum of the numbers of digital channels of the at least two target antenna panels, and the K ports are mapped to the at least two target antenna panels, K is a positive integer, and K is greater than or equal to L, and L is the number of data layers included in the PUSCH.

Before acquiring the uplink CSI according to the uplink signal resource sent by the terminal, the method further includes: indicating correspondence relationship between a port and a target transmission beam to the terminal.

Indicating the correspondence relationship between the port and the target transmission beam to the terminal, includes: indicating correspondence relationship between each port and a target transmission beam to the terminal; or indicating correspondence relationship between a port group and a target transmission beam to the terminal, wherein the K ports are divided into D port groups, and at least one target port group exists in the D port groups, the target port group is a port group including at least two ports, and D is a positive integer greater than 1.

To achieve the above objective, a terminal configured with at least two antenna panels for uplink transmission is provided in the embodiments of the present disclosure. The method includes a transceiver, a storage, a processor, and a program stored on the storage and executable by the processor, wherein when the processor executes the program, the processor implements the following steps: receiving, by a transceiver, Physical Uplink Shared Channel (PUSCH) scheduling information sent by a network device, wherein the PUSCH scheduling information includes first indication information and second indication information, and the first indication information is used to indicate a data layer included in a PUSCH, the second indication information is used to indicate a precoding matrix; and mapping, according to the precoding matrix indicated by the second indication information, the data layer included in the PUSCH onto at least two target antenna panels for transmission, wherein the target antenna panels are antenna panels, for transmitting the PUSCH, among the at least two antenna panels of the terminal.

When the processor executes the program, the processor further implements the following steps: transmitting a beam-training signal resource using analog beams on the at least two target antenna panels, before receiving the PUSCH scheduling information sent by the network device; acquiring a target transmission beam, indicated by the network device, corresponding to each of the target antenna panels, where the target transmission beam is acquired by the network device according to the beam-training, signal resource; transmitting an uplink signal resource, for acquiring channel state information (CSI), on each of the target antenna panels by using a target transmission beam corresponding to the target antenna panel, wherein the PUSCH scheduling information is acquired by the network device according to the uplink signal resource.

The uplink signal resource is an uplink signal resource including K ports, K is a sum of the numbers of digital channels of the at least two target antenna panels, and the K ports are mapped to the at least two target antenna panels, K is a positive integer, and K is greater than or equal to L, and L is the number of data layers included in the PUSCH.

When the processor executes the program, the processor further implements the following steps: determining a first target transmission beam corresponding to a first target port according to correspondence relationship between a port and a target transmission beam indicated by the network device; transmitting an uplink signal resource of the first target port on a first target antenna panel corresponding to the first target transmission beam.

When the processor executes the program, the processor further implements the following steps: performing a precoding operation on L data layers of the PUSCH according to the precoding matrix indicated by the second indication information, to acquire a transmission signal vector including K data layers, wherein, each data layer of the transmission signal vector corresponds to one of the ports; acquiring a second target port corresponding to a target data layer of the transmission signal vector; transmitting, on a second target antenna panel, the target data layer of the transmission signal vector using a second target transmission beam corresponding to the second target port, wherein the second target antenna panel is an antenna panel having mapping relationship with the second target port.

When the processor executes the program, the processor further implements the following steps: selecting a target beam-training signal resource set corresponding to a third target antenna panel from among beam-training signal resource sets configured by the network device for each of the target antenna panels, wherein each of the beam-training signal resource sets includes at least one beam-training signal resource, the third target antenna panel is any one of the at least two target antenna panels; transmitting beam-training signal resources of the target beam training signal set using different analog beams on the third target antenna panel.

To achieve the above objective, a computer-readable storage medium having stored thereon a computer program is provided in the embodiments of the present disclosure. When the computer program is executed by a processor, the processor implements the steps of the above data transmission method.

To achieve the above objective, a network device is provided in the embodiments of the present disclosure. The network device includes a transceiver, a storage, a processor, and a program stored on the storage and executable by the processor, wherein when the processor executes the program, the processor implements the following steps: acquiring uplink channel state information (CSI) according to an uplink signal resource sent by a terminal; acquiring Physical Uplink Shared Channel (PUSCH) scheduling information according to the CSI, and sending the acquired information to a terminal, wherein the PUSCH schedule information includes first indication information and second indication information, the first indication information is used to indicate a data layer included in a PUSCH, and the second indication information is used to indicate a preceding matrix.

When the processor executes the program, the processor further implements the following steps: acquiring a beam-training signal resource sent by the terminal using analog beams on at least two target antenna panels, before acquiring the uplink CSI according to the uplink signal resource sent by the terminal; performing a beam-scanning operation on the beam-training signal resource, determining a target transmission beam corresponding to each of the target antenna panels and indicating the target transmission beam to the terminal.

The uplink signal resource is an uplink signal resource including K ports, K is a sum of the numbers of digital channels of the at least two target antenna panels, and the K ports are mapped to the at least two target antenna panels, K is a positive integer, and K is greater than or equal to L, and L is the number of data layers included in the PUSCH.

When the processor executes the program, the processor further implements the following steps: indicating correspondence relationship between a port and a target transmission beam to the terminal, before acquiring the uplink CSI according to the uplink signal resource sent by the terminal.

When the processor executes the program, the processor further implements the following steps: indicating correspondence relationship between each port and a target transmission beam to the terminal; or indicating correspondence relationship between a port group and a target transmission beam to the terminal, wherein the K ports are divided into D port groups, and at least one target port group exists in the D port groups, the target port group is a port group including at least two ports, and D is a positive integer greater than 1.

To achieve the above objective, a computer-readable storage medium having stored thereon a computer program is provided in the embodiments of the present disclosure. When the computer program is executed by a processor, the processor implements the steps of the above data transmission method.

To achieve the above objective, a terminal configured with at least two antenna panels for uplink transmission is provided in the embodiments of the present disclosure. The terminal includes: a receiving module, configured to receive Physical Uplink Shared Channel (PUSCH) scheduling information sent by a network device, wherein the PUSCH scheduling information includes first indication information and second indication information, and the first indication information is used to indicate a data layer included in a PUSCH, the second indication information is used to indicate a precoding matrix; a first transmitting module, configured to map, according to the precoding matrix indicated by the second indication information, the data layer included in the PUSCH onto at least two target antenna panels for transmission, wherein the target antenna panels are antenna panels, for transmitting the PUSCH, among the at least two antenna panels of the terminal.

The terminal further includes: a second transmitting module, configured to transmit a beam-training signal resource using analog beams on the at least two target antenna panels; a first acquiring module, configured to acquire a target transmission beam, indicated by the network device, corresponding to each of the target antenna panels, where the target transmission beam is acquired by the network device according to the beam-training signal resource; a third transmitting module, configured to transmit an uplink signal resource, for acquiring channel state information (CSI), on each of the target antenna panels by using a target transmission beam corresponding to the target antenna panel, wherein the PUSCH scheduling information is acquired by the network device according to the uplink signal resource.

The uplink signal resource is an uplink signal resource including ports, K is a sum of the numbers of digital channels of the at least two target antenna panels, and the K ports are mapped to the at least two target antenna panels, K is a positive integer, and K is greater than or equal to L, and L is the number of data layers included in the PUSCH.

To achieve the above objective, a network device is provided in the embodiments of the present disclosure. The network device includes a second acquiring module, configured to acquire uplink channel state information (CSI) according to an uplink signal resource sent by a terminal; a fourth transmitting module, configured to acquire Physical Uplink Shared Channel (PUSCH) scheduling information according to the channel state information (CSI), and transmit the acquired information to a terminal, wherein the PUSCH schedule information includes first indication information and second indication information, the first indication information is used to indicate a data layer included in a PUSCH, and the second indication information is used to indicate a precoding matrix.

The network device further includes: a third acquiring module, configured to acquire a beam-training signal resource sent by the terminal using analog beams on at least two target antenna panels; a determining module, configured to perform a beam-scanning operation on the beam-training signal resource, determine a target transmission beam corresponding to each of the target antenna panels and indicate the target transmission beam to the terminal.

The uplink signal resource is an uplink signal resource including K ports, K is a sum of the numbers of digital channels of the at least two target antenna panels, and the K ports are mapped to the at least two target antenna panels, K is a positive integer, and K is greater than or equal to L, and L is the number of data layers included in the PUSCH.

The embodiments of the present disclosure have the following beneficial effects. In the technical solutions of the embodiments of the present disclosure, Physical Uplink Shared Channel (PUSCH) scheduling information sent by a network device is received, wherein the PUSCH scheduling information includes first indication information and second indication information, and according to the precoding matrix indicated by the second indication information, the data layer included in the PUSCH is mapped onto at least two target antenna panels for transmission, thereby achieving the purpose of simultaneously transmitting data layers of the PUSCH from a plurality of antenna panels.

DETAILED DESCRIPTION

In order to make technical problems, technical solutions and advantages to be solved by the present disclosure clearer, specific embodiments and drawings will be described in detail below.

For a purpose of enabling those skilled in the art to better understand the technical solutions of the embodiments of the present disclosure, the following description is made first.

In view of an important role of Multiple-Input Multiple-Output (MIMO) technology in improving peak rate and system spectrum utilization, wireless access technology standards such as Long Term Evolution (LTE) or LTE-Advanced (LTE-A) are all based on the MIMO+Orthogonal Frequency Division Multiplexing (OFDM) technologies. A performance gain of MIMO technology comes from a spatial freedom degree available in the multi-antenna system, so one of the most important evolution directions of the MIMO technology in a standardization development process is extension of dimensions.

In LTE Rel-8, MIMO transmission of at most 4 layers can be supported. Rel-9 focuses on enhancing a Multi-User Multiple-Input Multiple-Output (MU-MIMO) technology, and MU-MIMO transmission in a transmission mode (TM)-8 can support at most four downlink data layers. Rel-10 introduces a support for 8 antenna port to further improve a spatial resolution of channel state information, and further expands a transmission capability of single-user MIMO (Single-User MIMO, SU-MIMO) to at most 8 data layers. Rel-13 and Rel-14 introduce FD-MIMO technology to support 32 ports to realize full-dimensional and vertical beamforming.

In order to further improve the MIMO technology, a massive antenna technology is introduced into a mobile communication system. A fully digitized massive antenna of a base station may have up to 128/256/512 antenna elements and up to 128/256/521 transceivers, a transceiver being connected to each antenna element. By transmitting pilot signals for up to 128/256/512 antenna ports, a terminal measures channel state information and performs feedback. An antenna array of up to 32/64 antenna elements may also be configured for a terminal. By beamforming on both sides of the base station and the terminal, a huge beamforming gain is acquired to compensate signal attenuation caused by path loss. In particular, at high frequency band communication, for example at 30 Ghz, that path loss make a coverage range of radio signals be extremely limited. By the massive antenna technology, the coverage range of the radio signals can be expanded to a practical range.

Figure 1:
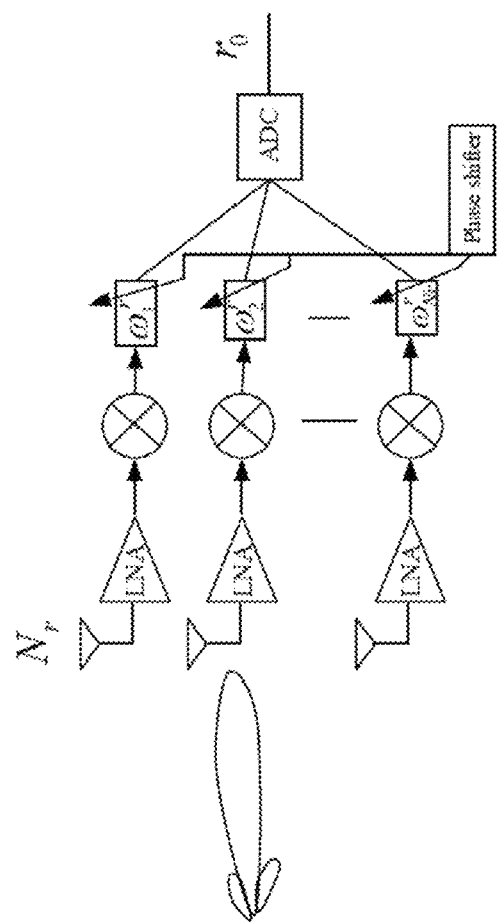
FIG. 1 is a schematic diagram of weighting and shaping an intermediate frequency signal in analog beamforming in the related art.
Figure 1:
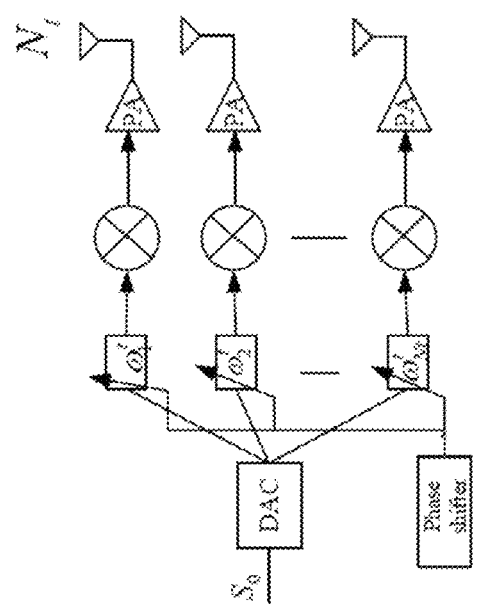
Figure 2:
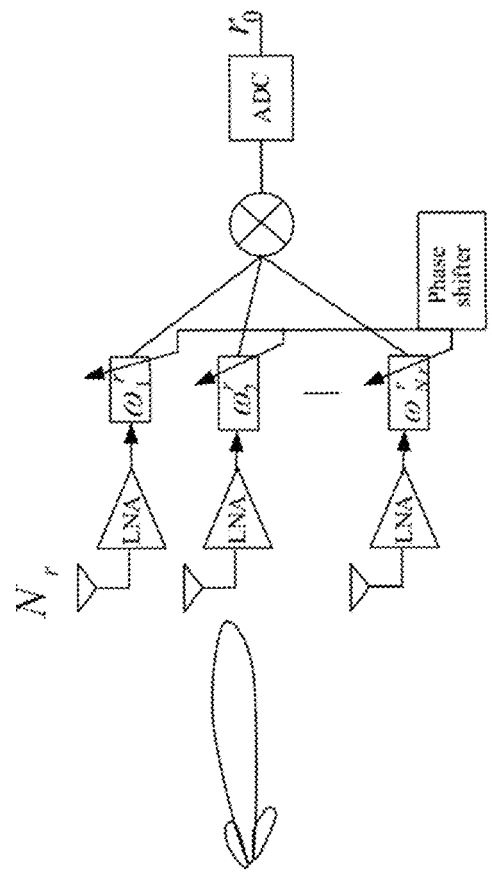
FIG. 2 is a schematic diagram of weighting and shaping a radio frequency signal in analog beamforming in the related art.
Figure 2:
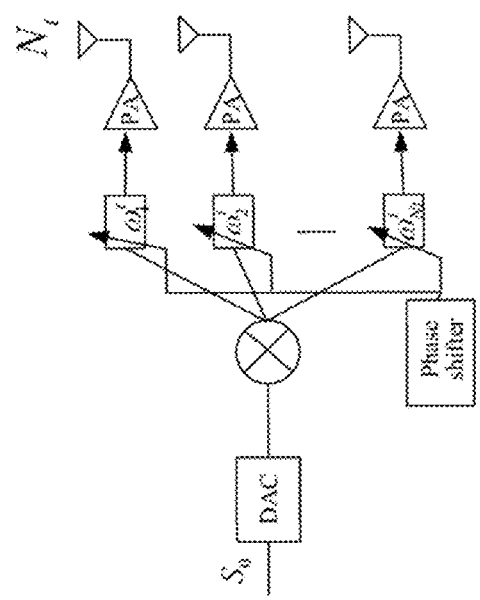

Each antenna element having a separate transceiver in an fully-digital antenna array will result in a significant increase in a size, a cost and power consumption of a device. In particular, power consumption reduction and performance improvement for an Analog-to-Digital Converter (ADC) and a Digital-to-Analog Converter (DAC) of a transceiver are relatively limited. In order to reduce the size, the cost and the power consumption of the device, a technical solution based on analog beamforming is proposed. As shown in FIGS. 1 and 2. a main feature of the analog beamforming is as follows, i.e., the intermediate frequency signal (FIG. 1) or the radio frequency signal (FIG. 2) is weighted and shaped by a phase shifter.

Figure 3:
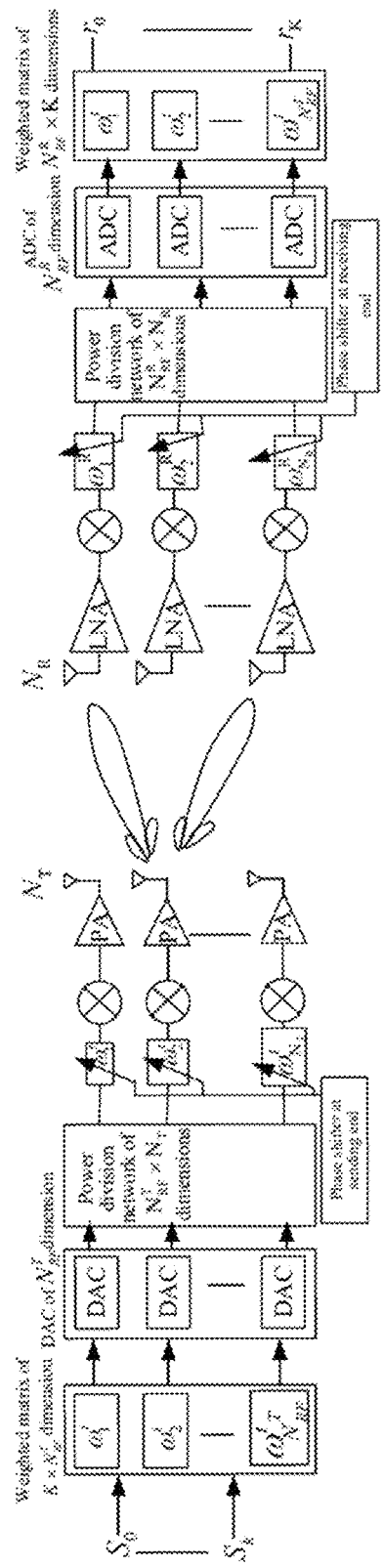
FIG. 3 is a schematic diagram of digital-analog hybrid beamforming in the related art.

In order to further improve the performance of the analog beamforming, a solution of a digital-analog hybrid beamforming transceiver architecture is proposed, as shown in FIG. 3. In FIG. 3, there are $N_{RF}^T$ transceivers at a transmitting end and $N_{RF}^R$ transceivers at a receiving end, respectively, the number of antenna elements at the transmitter end is $N^T > N_{RF}^T$ and the number of antenna elements at e receiving end is $N^R > N_{RF}^R$. The maximum number of parallel transmission streams supported by beamforming is $\min(N_{RF}^T, N_{RF}^R)$. A hybrid beamforming structure of FIG. 3 achieves a tradeoff between flexibility of digital beamforming and low complexity of analog beamforming.

Both analog beamforming and digital-analog hybrid beamforming need to adjust weights of analog beamforming at both the transmitting end and the receiving end, so that formed beams can be directed to a communication opposite end. It is necessary to adjust a beamforming weight sent by the base station side and a beamforming weight received by the terminal side. For uplink transmission, it is necessary to adjust the beamforming weight sent by the terminal side and the beamforming received by the base station side. A weight of the beamforming is usually acquired by transmitting a training signal. In a downlink direction, the base station transmits a downlink beam-training signal, and the terminal measures the downlink beam-training signal, selects an optimal transmission beam sent by the base station, and feeds back beam-related information to the base station, and at the same time, a corresponding optimal receiving beam is selected and saved locally.

The UE may have a plurality of antenna panels for uplink transmission, transmission by a single antenna panel and transmission by multiple antenna panels are described below, respectively.

(1) Transmission by a Single Antenna Panel

A with a single panel may be configured with one set of SRS resources for transmitting-beam-scanning. Each SRS resource set includes a plurality of SRS resources, and different SRS resources can be beamformed using different beams. Since each panel can only generate one analog beam at a time, different SRS resources (corresponding to different beams) in one SRS resource set are transmitted at different time instances. A gNB determines an optimal transmission beam (i.e., the SRS resource with an optimal reception quality) by receiving the set of SRS resources, and indicates to the UE.

The gNB may then configure a second set of SRS resources for CSI acquisition, the second set of SRS resources contains multiple SRS resources, and may use the same or different analog beams (based on previous beam-scanning). The gNB sends an SRI indication, in a scheduling grant for a PUSCH, pointing to the second set of SRS resources (an SRS resource set for CSI acquisition) according to a channel estimation result. The UE performs PUSCH transmission according to a beam indicated by the SRI.

(2) Transmission of Multiple Antenna Panels

Similarly, if the UE has multiple panels, the multiple panels may be configured with multiple SRS resource sets for analog beam-training, where each SRS set corresponds to one panel. Different SRS resources of the same SRS resource set (corresponding to one panel) are transmitted at different time instants. Because different sets of SRS resources are mapped to different panels, the SRS resources of different SRS resource sets can be transmitted at the same or different time instants. In this case, an overhead of an SRS varies linearly with the number of antenna panels. For a terminal with a large number of antenna panels (e.g., vehicles, balloons, and other aircrafts with less constraints in power and size), the number of the overhead of an SRS may be significant.

Figure 4:
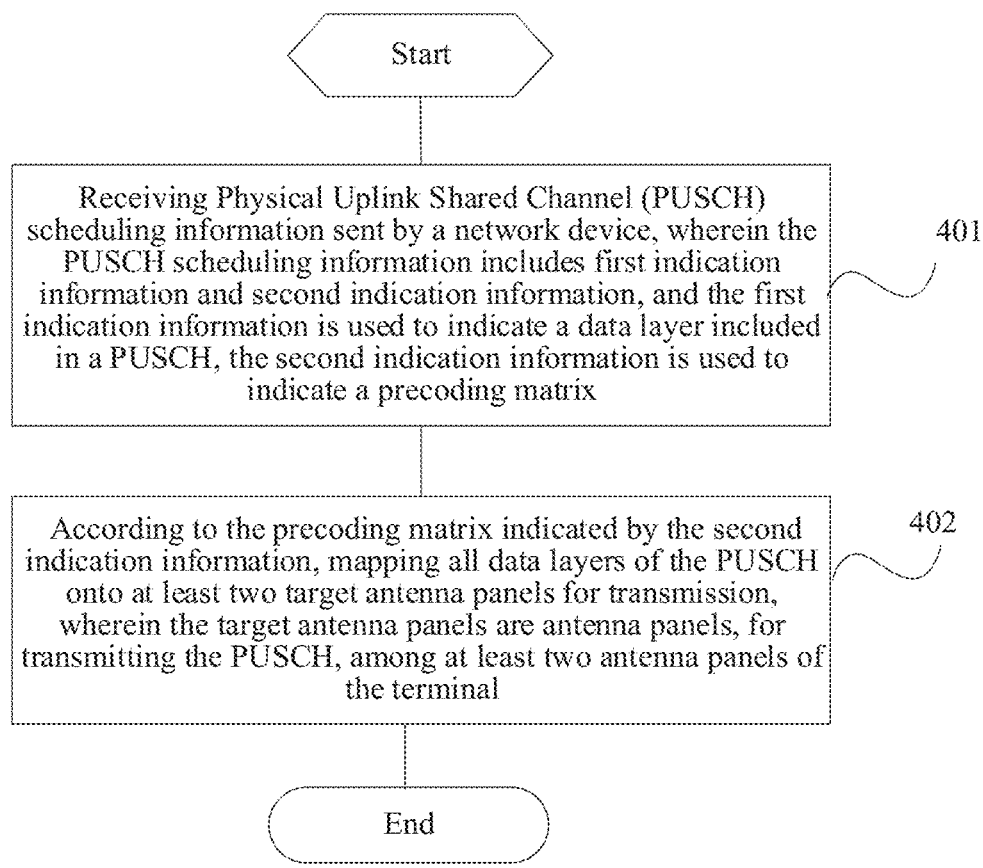
FIG. 4 is a first schematic flow diagram of a data transmission method according to an embodiment of the present disclosure.

However, a specification in the related art cannot support a joint transmission mode in which a PUSCH is simultaneously transmitted from multiple antenna panels, resulting in a low transmission rate. Based on this, the embodiments of the present disclosure provide a data transmission method, which is applied to a terminal, the terminal is configured with at least two antenna panels for uplink transmission, and as shown in FIG. 4, the data transmission method includes following steps.

Step 401: receiving Physical Uplink Shared Channel (PUSCH) scheduling information sent by a network device, wherein the PUSCH scheduling information includes first indication information and second indication information, and the first indication information is used to indicate a data layer included in a PUSCH, the second indication information is used to indicate a precoding matrix.

The PUSCH scheduling information is carried in a PUSCH scheduling grant, wherein the first indication information is a transmission rank indicator (TRI), and the second indication information is a transmit precoding matrix indicator (TPMI). The aforementioned precoding matrix refers to a precoding matrix of K×L, where K is a sum of the number of digital channels of at least two target antenna panels for transmitting a PUSCH, and L is the number of data layers included in the PUSCH.

Step 402: according to the precoding matrix indicated by the second indication information, mapping all data layers of the PUSCH onto at least two target antenna panels for transmission, wherein the target antenna panels are antenna panels, for transmitting the PUSCH, among at least two antenna panels of the terminal.

Specifically, the terminal performs digital-precoding processing based on the precoding matrix to acquire a transmission signal vector including K data layers, and maps the transmission signal vector to at least two target antenna panels for transmission.

The data transmission method according to an embodiment of the present disclosure is configured to receive physical uplink shared channel (PUSCH) scheduling information sent by a network device, the PUSCH scheduling information includes a first indication information and a second indication information, and according to a precoding matrix indicated by the second indication information, a data layer included in the PUSCH is mapped to at least two target antenna panels for transmission, thereby achieving a purpose of simultaneously transmitting the data layer of the PUSCH from a plurality of antenna panels.

Before receiving the physical uplink shared channel (PUSCH) scheduling information sent by the network device in step 402, the method further includes steps 4021 to 4023.

Step 4021: transmitting a beam-training signal resource using analog beams on the at least two target antenna panels.

The beam-training signal resource herein may be specifically a sounding reference signal (SRS) resource.

A target beam-training signal resource set corresponding to a third target antenna panel is selected from among beam-training signal resource sets configured by the network device for each of the target antenna panels; each of the beam-training signal resource sets includes at least one beam-training signal resource, the third target antenna panel is any one of the at least two target antenna panels; beam-training signal resources of the target beam training signal set are transmitted using different analog beams on the third target antenna panel, the beam-training signal resource having a beam-training signal carried thereon.

Assuming that multiple data layers of the PUSCH are distributed over 2 target antenna panels for transmission, then first the base station gNB configures 2 SRS resource sets for analog beam-training, where each SRS resource set is mapped to one antenna panel. A specific mapping method for mapping the sets of SRS resources to the panels depends on implementation of the UE. For example, the UE may map a first set of SRS resources for analog beam-training to panel 1, and map a second set of SRS resources for analog beam-training, to panel 2; or the UE may map the first set of SRS resources used for analog beam-training to panel 2, and map the second set of SRSs resources used for analog beam-training to panel 1. The order of this mapping may be transparent to the gNB. Each set of SRS resources contains a group of SRS resources that can use different time-frequency resources. For each set of SRS resources, the UE transmits SRS resources using different analog beams on the panels corresponding thereto, respectively.

Step 4022: acquiring a target transmission beam, indicated by the network device, corresponding to each of the target antenna panels, where the target transmission beam is acquired by the network device according to the beam-training signal resource.

The gNB determines an optimal receiving beam by means of beam-scanning. The gNB may select an optimal receiving beam for each panel individually based on a hypothesis of single panel transmission hypothesis. As an option, it may be assumed that all panels transmit jointly and then an optimal receiving beam is derived. In this process, the gNB may control configuration of time-frequency resources of two SRS resource sets (e.g., orthogonal time-frequency resources, or same resources). At the same time, the gNB can also acquire an optimal transmission beam (marked as [$BM_{opt,1}$, $BM_{opt,2}$]) for each panel, which respectively corresponds to the optimal SRS resource (marked as [$SRS_{opt,1}$, $SRS_{opt,2}$]) in the respective SRS resource set. Through a control signaling, the UE can know [$SRS_{opt,1}$, $SRS_{opt,2}$], so as to acquire a recommended SRS resource on each panel, and determine the optimal transmission beam [$BM_{opt,1}$, $BM_{opt,2}$]) on each antenna panel based on the recommended SRS resource on each antenna panel.

It should be noted that the above description does not exclude a case in which the gNB recommends a plurality of uplink transmission beams for each panel. In particular, the gNB may not only recommend an optimal beam for each panel, but may also recommend other beams worse than the optimal beam in sequence. This can be directly extended from the solution described above, and the optimal transmission beam (the target transmission beam) may be specifically a transmission beam corresponding to the SRS resource with an optimal reception quality, for example, the transmission beam corresponding to the SRS resource with the strongest received signal power.

Step 4023: sending an uplink signal resource, for acquiring channel state information (CSI), on each of the target antenna panels by using a target transmission beam corresponding to the target antenna panel, wherein the PUSCH scheduling information is acquired by the network device according to the uplink signal resource.

Here, the uplink signal resource for acquiring the CSI is an SRS resource.

By transmitting this uplink signal resource, the terminal can cause the network device to estimate uplink CSI and perform link adaptation and PUSCH scheduling.

Further, the uplink signal resource is an uplink signal resource including K ports, K is a sum of the numbers of digital channels of the at least two target antenna panels, and the K ports are mapped to the at least two target antenna panels, K is a positive integer, and K is greater than or equal to L, and L is the number of data layers included in the PUSCH.

Figure 5:
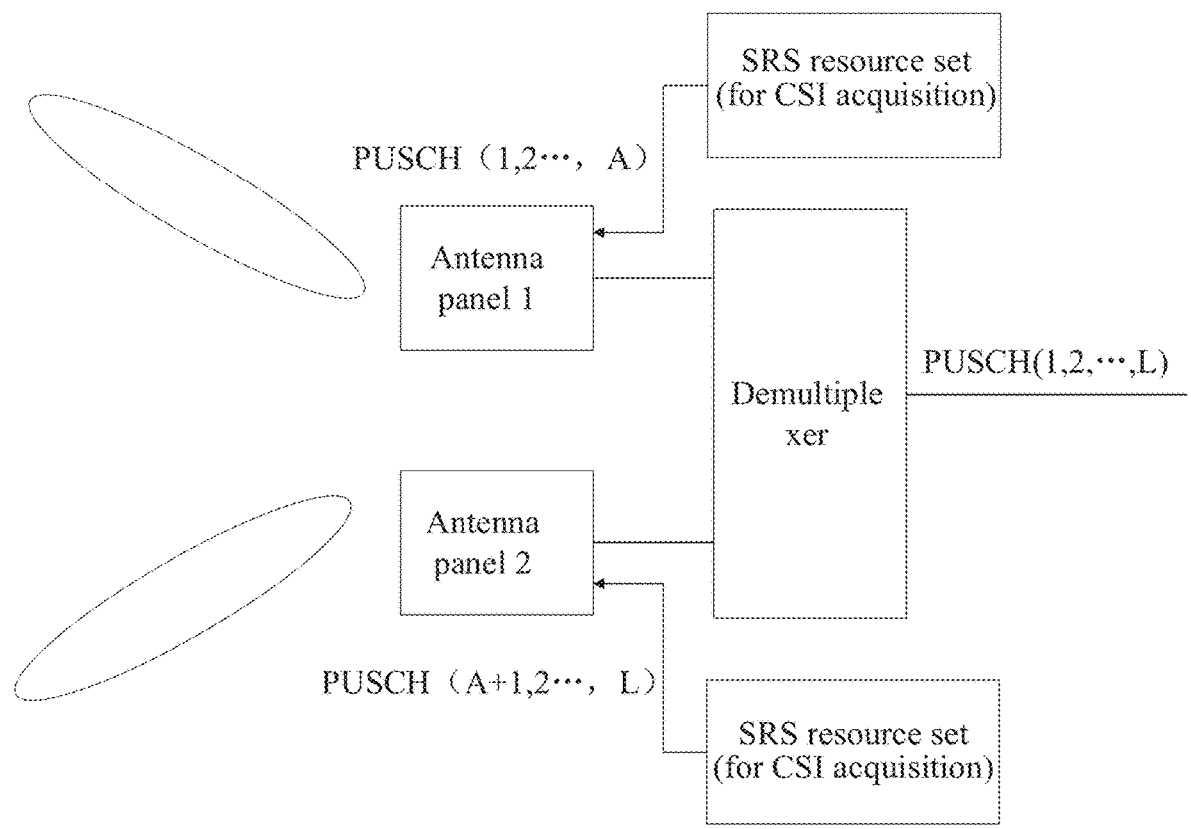
FIG. 5 is a schematic diagram of PUSCH transmission in an embodiment of the present disclosure.

After determining the optimal transmission beam on each antenna panel through beam-scanning by the network device, the network device further configures an SRS resource for CSI acquisition for the terminal. As shown in FIG. 5, it is assumed that a plurality of data layers of the PUSCH are distributed over two target antenna panels for transmission, wherein layer 1 to layer A of the PUCCH are mapped onto an antenna panel 1 for transmission and layer A+1 to layer L are mapped to an antenna panel 2 for transmission, wherein A is a positive integer greater than 1 and less than L. The base station gNB configures two SRS resource sets for CSI acquisition, wherein each SRS resource set is mapped to one antenna panel, for example, a third SRS resource set used for the CSI acquisition are mapped to the antenna panel 1, a fourth set of SRS resources for CSI acquisition is mapped onto the antenna panel 2.

The numbers of digital channels of the two antenna panels are denoted as N1 and N2, respectively, and the total number of the digital channels is K=N1+N2. The gNB configures one SRS resource containing K ports. In time domain, the SRS resource may be configured for periodic transmission, semi-periodic transmission, or aperiodic transmission.

Based on this, the above sending the uplink signal resource, for acquiring CSI, on each target antenna panel by using the target transmission beam corresponding to the target antenna panel includes: determining a first target transmission beam corresponding to a first target port according to correspondence relationship between a port and a target transmission beam indicated by the network device, and sending an uplink signal resource of the first target port on a first target antenna panel corresponding to the first target transmission beam.

Beams used by the SRS resources sent for CSI measurement on each panel are acquired through [$SRS_{opt,1}$, $SRS_{opt,2}$]. Here, numbering values of SRS ports of the antenna panel 1 and numbering values of SRS ports of the antenna panel 2 are denoted as [p1, p2, ... $p_{N1}$] and [q1, q2, ... $q_{N2}$], respectively. Ports [p1, p2, ... $p_{N1}$] are mapped to the antenna panel 1 and $BM_{opt,1}$ is used as an analog beam thereof. Thus, the gNB instructs the UE to use the same analog beam as $SRS_{opt,1}$ at [p1, p2, ... $p_{N1}$]. Similarly, antenna ports [q1, q2, ... $q_{N2}$] are mapped to the panel 2 and $BM_{opt,2}$ is used as an analog beam thereof. Thus, the gNB instructs the UE to use the same analog beam as $SRS_{opt,2}$ at [q1, q2, ... $q_{N2}$].

In the embodiment of the present disclosure, the correspondence relationship between a port and a target transmission beam may be indicated to the terminal in the following two ways:

First Way: Through a Port-Specific Indication Way

The correspondence relationship between each of ports and a target transmission beam is indicated to the terminal through a port-specific indication.

Here, each port may use the same or different uplink transmission beams.

Second Way: Through a Port-Group Specific Indication Way

The correspondence relationship between a port group and a target transmission beam is indicated to a terminal through a port-group specific indication, wherein the K ports are divided into D port groups, and at least one target port group exists in the D port groups, the target port group is a port group including at least two ports, and D is a positive integer greater than 1.

In the embodiment of the present disclosure, no matter which of the above indication ways is adopted, the correspondence relationship can be indicated by performing configuration of spatial relation information (SpatialRelationInfo) on a higher-layer information field, and of course, besides the spatial relation information, other information may also be used for configuring indications. For example, in the above second way, multiple values of "SpatialRelationInfo" are provided for the UE, and the port group corresponding to each value is notified to the UE.

If numbering values of ports in the port group are always sequential, it is more appropriate to use the port-group specific transmitting-beam indication. For example, when [p1, p2, ... $p_{N1}$]=[1, 2, ..., N1] and [q1, q2, ... $q_{N2}$]=(N1+1, ..., N1+N2], gNB can configure two "SpatialRelationInfo" parameters. The first "SpatialRelationInfo" corresponds to $SRS_{opt,1}$, i.e. ports [1, 2, ..., N1], and the second "SpatialRelationInfo" corresponds to $SRS_{opt,2}$, i.e. ports [N1+1, ..., N1+N2]. Therefore, a lower RRC overhead can be occupied, in particular when that a port group is semi-statically configured.

If the numbering values of ports in the port group are not sequential (i.e., discontinuous), either of the above ways can be used.

In addition, SRS ports in an SRS resource can be grouped semi-statically or dynamically. If being grouped semi-statically, the SRS resource, the number of port groups and the numbering values of ports in each group are semi-statically configured. If being grouped dynamically, the number of port groups and the numbering values of ports in each group are notified through L1 dynamic signaling (for example, together with a SRS trigger grant). If being grouped dynamically, grouping information (i.e., the number of groups and the numbering values of ports in each group) may be indicated jointly with uplink transmission beam information e.g., "SpatialRelationInfo") or independently from uplink transmission beam information (e.g., "SpatialRelationInfo").

If the number of groups of SRS ports is semi-statically configured, the number values of SRS ports in each group can be indicated dynamically.

Further, according to the precoding matrix indicated by the second indication information, mapping all data layers of the PUSCH onto at least two target antenna panels for transmission in step 402 includes: performing a precoding operation on the L data layers of the PUSCH according to the precoding matrix indicated by the second indication information, to acquire a transmission signal vector including K data layers, wherein, each data layer of the transmission signal vector corresponds to one of the ports; acquiring a second target port corresponding to a target data layer of the transmission signal vector; transmitting, on a second target antenna panel, the target data layer of the transmission signal vector using a second target transmission beam corresponding to the second target port, wherein the second target antenna panel is an antenna panel having mapping relationship with the second target port.

The target data layer is any one of the L data layers of the PUSCH.

Here, after the base station receives the uplink signal resources for CSI acquisition, the base station estimates the uplink CSI, and performs link adaptation and PUSCH scheduling. A scheduling grant may include a TRI (transmission rank indicator) used to indicate the number of data layers included in the PUSCH; a TPMI (transmit precoding matrix indicator) used to indicate a (N1+N2)×L precoding matrix W. The UE performs digital precoding based on the above information to form a transmission signal vector having a length of (N1+N2). N1 data layers corresponding to ports [p1, p2, . . . , $p_{N1}$] are sent through the panel 1 and using the beam corresponding to the "SpatialRelationInfo" parameter given by $SRS_{opt,1}$; and N2 data layers corresponding to [q1, q2, . . . , $q_{N2}$] are sent through the panel 2 and using the beam corresponding to the "SpatialRelationInfo" parameter given by $SRS_{opt,2}$. In short, for a data layer corresponding to an SRS port S in the PUSCH, transmission is performed on the same antenna panel using an uplink transmission beam corresponding to the SRS ports, S is a positive integer greater than 1, and S=N1+N2.

The data transmission method according to an embodiment of the present disclosure is configured to: receive Physical Uplink Shared Channel (PUSCH) scheduling information sent by a network device, wherein the PUSCH scheduling information includes first indication information and second indication information; and according to a precoding matrix indicated by the second indication information, map a data layer included in the PUSCH to at least two target antenna panels for transmission, thereby achieving the purpose of simultaneously transmitting the data layer of the PUSCH from a plurality of antenna panels.

Figure 6:
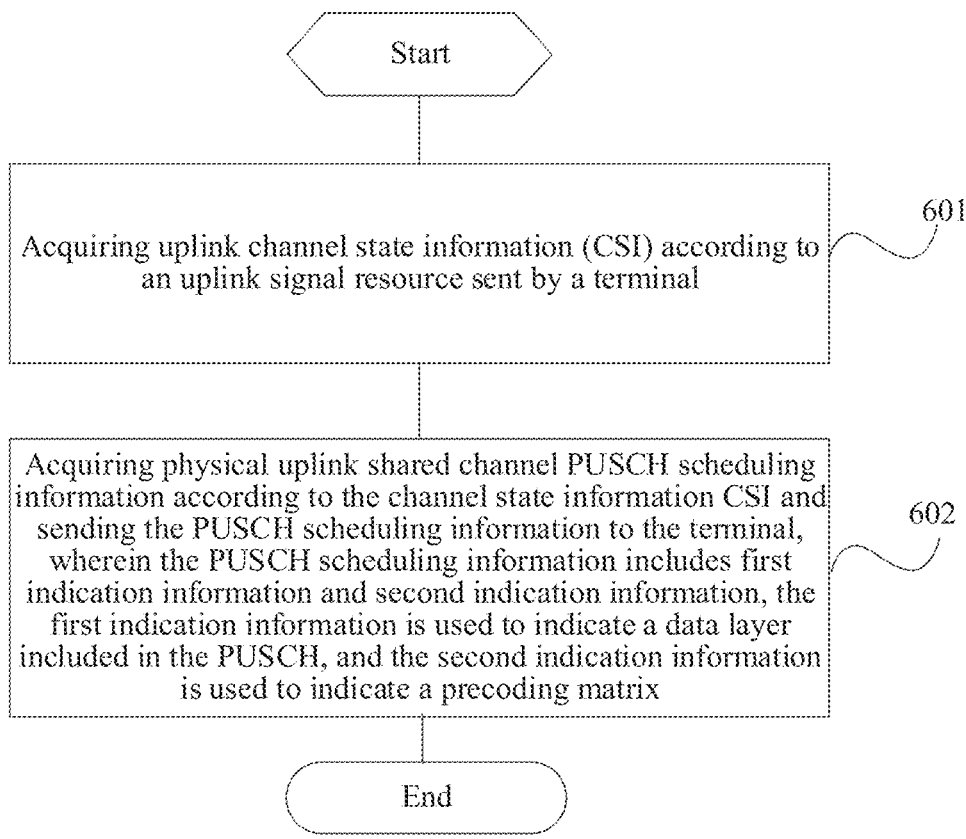
FIG. 6 is a second schematic flow diagram of a data transmission method according to an embodiment of the present disclosure.

As shown in FIG. 6, an embodiment of the present disclosure further provides a data transmission method, which is performed by a network device, and the network device may be specifically a base station, and includes steps 601 and 602.

Step 601: acquiring uplink channel state information (CSI) according to an uplink signal resource sent by a terminal.

The uplink signal resource is specifically an SRS resource configured by the base station for the terminal for CSI acquisition.

The network device first determines an optimal transmission beam on each antenna panel according to a beam-training signal resource transmitted by the terminal, and then configures an SRS resource for CSI acquisition for the terminal. As shown in FIG. 5, it is assumed that a plurality of data layers of the PUSCH are distributed over two target antenna panels for transmission, wherein layer 1 to layer A of the PUCCH are mapped onto an antenna panel 1 for transmission and layer A+1 to layer L are mapped to an antenna panel 2 for transmission, wherein A is a positive integer greater than 1 and less than L. The base station gNB configures two SRS resource sets for CSI acquisition, wherein each SRS resource set is mapped to one antenna panel, for example, a third SRS resource set used for the CSI acquisition are mapped to the antenna panel 1, a fourth set of SRS resources for CSI acquisition is mapped onto the antenna panel 2.

Step 602: acquiring physical uplink shared channel PUSCH scheduling information according to the channel state information CSI and sending the PUSCH scheduling information to the terminal, wherein the PUSCH scheduling information includes first indication information and second indication information, the first indication information is used to indicate a data layer included in the PUSCH, and the second indication information is used to indicate a precoding matrix.

Here, the PUSCH scheduling information is carried in a PUSCH scheduling grant, wherein after receiving the uplink signal resource used for CSI acquisition, the base station estimates uplink CSI, and performs link adaptation and PUSCH scheduling. The scheduling grant may include a transmission rank indicator (TRI) used to indicate the number of data layers included in the PUSCH, and a transmit precoding matrix indicator (TPMI) used to indicate a K×L precoding matrix W.

Here, after the PUSCH scheduling information is sent to the terminal, the terminal performs digital-precoding processing on the PUSCH based on the precoding matrix to acquire a transmission signal vector including K data layers, and maps the transmission signal vector to at least two target antenna panels for transmission.

Further, before acquiring the uplink channel state information (CSI) according to the uplink signal resource sent by the terminal in step 601, the method further includes: acquiring a beam-training signal resource transmitted by the terminal using analog beams on at least two target antenna panels, performing a beam-scanning operation on the beam-training signal resource, determining a target transmission beam corresponding to each of the target antenna panels and indicating the target transmission beam to the terminal.

In the embodiments of the present disclosure, the beam-training signal resource herein may be specifically a sounding reference signal (SRS) resource. Assuming that the plurality of data layers of the PUSCH are distributed over two target antenna panels for transmission, first the base station gNB configures two SRS resource sets for analog beam-training, where each SRS resource set is mapped to one antenna panel. A specific mapping method for mapping the sets of SRS resources to the panels depends on implementation of the UE. For example, the UE may map a first set of SRS resources for analog beam-training to panel 1, and map a second set of SRS resources for analog beam-training to panel 2; or the may map the first set of SRS resources used for analog beam-training to panel 2, and map the second set of SRSs resources used for analog beam-training to panel 1. The order of this mapping may be transparent to the gNB. Each set of SRS resources contains a group of SRS resources that can use different time-frequency resources. For each set of SRS resources, the UE transmits SRS resources using different analog beams on the panels corresponding thereto, respectively.

The gNB determines an optimal receiving beam by means of beam-scanning. The gNB may select an optimal receiving beam for each panel individually based on a hypothesis of single panel transmission hypothesis. As an option, it may be assumed that all panels transmit jointly and then an optimal receiving beam is derived. In this process, the gNB may control configuration of time-frequency resources of two SRS resource sets (e.g., orthogonal time-frequency resources, or same resources). At the same time, the gNB can also acquire an optimal transmission beam (marked as [$BM_{opt,1}$, $BM_{opt,2}$]) for each panel, which respectively corresponds to the optimal SRS resource (marked as [$SRS_{opt,1}$, $SRS_{opt,2}$]) in the respective SRS resource set. Through a control signaling, the UE can know [$SRS_{opt,1}$, $SRS_{opt,2}$], so as to acquire a recommended SRS resource on each panel, and determine the optimal transmission beam ([$BM_{opt,1}$, $BM_{opt,2}$]) on each antenna panel based on the recommended SRS resource on each antenna panel.

It should be noted that the above description does not exclude a case in which the gNB recommends a plurality of uplink transmission beams for each panel. In particular, the gNB may not only recommend an optimal beam for each panel, but may also recommend other beams worse than the optimal beam in sequence. This can be directly extended from the solution described above, and the optimal transmission beam (the target transmission beam) may be specifically a transmission beam corresponding to the SRS resource with an optimal reception quality, for example, the transmission beam corresponding to the SRS resource with the strongest received signal power.

Further, the uplink signal resource is an uplink signal resource including K ports, K is a sum of the numbers of digital channels of the at least two target antenna panels, and the K ports are mapped to the at least two target antenna panels, K is a positive integer, and K is greater than or equal to L, and L is the number of data layers included in the PUSCH.

Further, before acquiring the uplink channel state information (CSI) according to the uplink signal resource transmitted by the terminal, the method further includes: indicating correspondence relationship between the port and the target transmission beam to the terminal.

Specifically, correspondence relationship between each port and a target transmission beam is indicated to the terminal; or, correspondence relationship between a port group and a target transmission beam is indicated to the terminal, and the port group includes at least two ports.

In the embodiment of the present disclosure, the correspondence relationship between the port and the target transmission beam nay be indicated to the terminal in the following two ways.

First Way: Through a Port-Specific Indication Way

The correspondence relationship between each port and a target transmission beam is indicated to the terminal through a port-specific indication.

Here, each port may use the same or different uplink transmission beams.

Second Way: Through a Port-Group Specific Indication Way

The correspondence relationship between a port group and a target transmission beam is indicated to a terminal through a port-group specific indication, wherein the K ports are divided into D port groups, and at least one target port group exists in the D port groups, the target port group is a port group including at least two ports, and D is a positive integer greater than 1.

In the embodiment of the present disclosure, no matter which of the above indication ways is adopted, the correspondence relationship can be indicated by performing configuration of spatial relation information (SpatialRelationInfo) on a higher-layer information field, and of course, besides the spatial relation information, other information may also be used for configuring indications. For example, in the above second way, multiple values of "SpatialRela-tionInfo" are provided for the UE, and the port group corresponding to each value is notified to the UE.

If numbering values of ports in the port group are always sequential, it is more appropriate to use the port-group specific transmitting-beam indication. For example, when [$p1, p2, \ldots, p_{N1}$]=[1, 2, . . . , N1] and [$q1, q2, \ldots, q_{N2}$]=(N1+1, . . . , N1+N2], gNB can configure two "SpatialRelationInfo" parameters. The first "SpatialRelationInfo" corresponds to $SRS_{opt,1}$, i.e. ports [1, 2, . . . , N1], and the second "SpatialRelationInfo" corresponds to $SRS_{opt,2}$, i.e. ports [N1+1, . . . , N1+N2]. Therefore, a lower RRC overhead can be occupied, in particular when that a port group is semi-statically configured.

If the numbering values of ports in the port group are not sequential (i.e., discontinuous), either of the above ways can be used.

In addition, SRS ports in an SRS resource can be grouped semi-statically or dynamically. If being grouped semi-statically, the SRS resource, the number of port groups and the numbering values of ports in each group are semi-statically configured. If being grouped dynamically, the number of port groups and the numbering values of ports in each group are notified through L1 dynamic signaling (for example, together with a SRS trigger grant). If being grouped dynamically, grouping information (i.e., the number of groups and the numbering values of ports in each group) may be indicated jointly with uplink transmission beam information (e.g., "SpatialRelationInfo") or independently from uplink transmission beam information (e.g., "SpatialRelation-Info").

If the number of groups of SRS ports is semi-statically configured, the number values of SRS ports in each group can be indicated dynamically.

The data transmission method according to the embodiment of the present disclosure acquires uplink channel state information (CSI) according to an uplink signal resource sent by a terminal, and according to the CSI, Physical Uplink Shared Channel (PUSCH) scheduling information is acquired and sent to the terminal, so that the terminal maps, according to the preceding matrix indicated by the second indication information, data layers included in the PUSCH onto at least two target antenna panels for transmission, so as to achieve a purpose of simultaneously transmitting the data layers of a PUSCH by a plurality of antenna panels.

Figure 7:
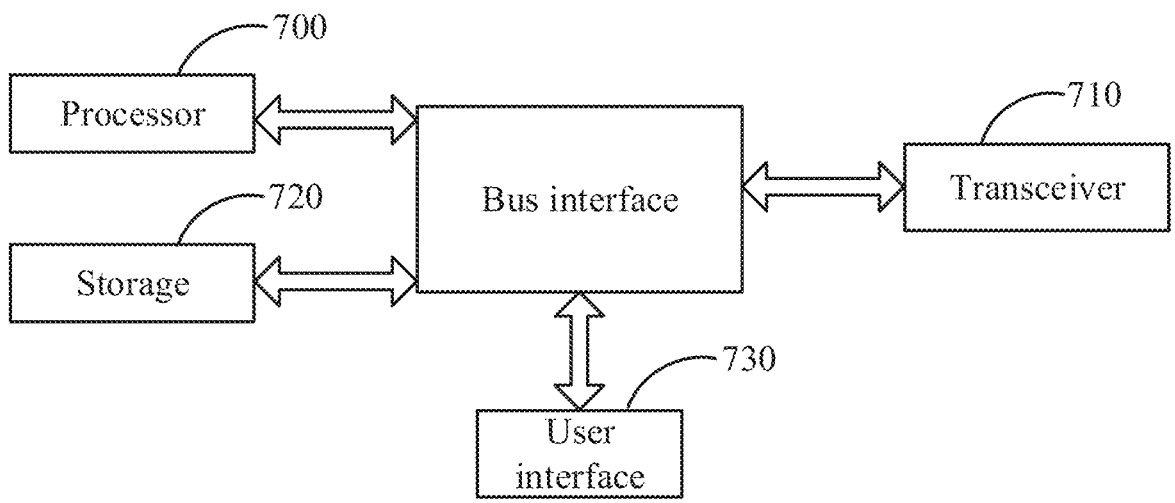
FIG. 7 is a structural block diagram of a terminal according to an embodiment of the present disclosure.

As shown in FIG. 7, the embodiments of the present disclosure further provide a terminal configured with at least two antenna panels for uplink transmission. The terminal includes a transceiver 710, a storage 720, a processor 700 and a computer program stored on the storage 720 and executable by the processor 700, and in a case that the processor 700 executes the computer program, the processor 700 implements the following steps: receiving Physical Uplink Shared Channel (PUSCH) scheduling information sent by a network device, wherein the PUSCH scheduling information includes first indication information and second indication information, and the first indication information is used to indicate a data layer included in a PUSCH, the second indication information is used to indicate a precoding matrix; according to the precoding matrix indicated by the second indication information, mapping the data layer of the PUSCH onto at least two target antenna panels for transmission, wherein the target antenna panels are antenna panels, for transmitting the PUSCH, among at least two antenna panels of the terminal.

In FIG. 7, a bus architecture may include any number of interconnected buses and bridges, particularly, various circuits such as one or more processors represented by the processor 700 and a storage represented by the storage 720 are linked together. The bus architecture may also link various other circuits, such as peripheral devices, voltage regulators, and power management circuits, etc. which are well known in the art, and therefore will not be described further herein. A bus interface provides an interface. The transceiver 710 can be a number of elements, including a transmitter and a transceiver, providing a unit for communicating with various other devices over a transmission medium. For different user equipments, a user interface 730 may also be an interface capable of connecting with an internal device or an external device. The connected devices may include, but are not limited to, a keypad, a display, a speaker, a microphone, a joystick. The processor 700 is responsible for managing a bus architecture and general processing, and the storage 720 can store data used by the processor 700 in performing operations.

Optionally, the processor 700 is further configured to read the program in the storage 720, and perform the following steps: transmitting a beam-training signal resource using analog beams on the at least two target antenna panels; acquiring a target transmission beam, indicated by the network device, corresponding to each of the target antenna panels, where the target transmission beam is acquired by the network device according to the beam-training signal resource; sending an uplink signal resource, for acquiring channel state information (CSI), on each of the target antenna panels by using a target transmission beam corresponding to the target antenna panel, wherein the PUSCH scheduling information is acquired by the network device according to the uplink signal resource.

Optionally, the uplink signal resource is an uplink signal resource including K ports, K is a sum of the numbers of digital channels of the at least two target antenna panels, and the K ports are mapped to the at least two target antenna panels, K is a positive integer, and K is greater than or equal to L, and L is the number of data layers included in the PUSCH.

Optionally, the processor 700 is further configured to read the program in the storage 720, and perform the following steps: determining a first target transmission beam corresponding to a first target port according to correspondence relationship between a port and a target transmission beam indicated by the network device, and sending an uplink signal resource of the first target port on a first target antenna panel corresponding to the first target transmission beam.

Optionally, the processor 700 is further configured to read the program in the storage 720, and perform the following steps: performing a precoding operation on L data layers of the PUSCH according to the precoding matrix indicated by the second indication information, to acquire a transmission signal vector including K data layers, wherein, each data layer of the transmission signal vector corresponds to one of the ports; acquiring a second target port corresponding to a target data layer of the transmission signal vector; transmitting, on a second target antenna panel, the target data layer of the transmission signal vector using a second target transmission beam corresponding to the second target port, wherein the second target antenna panel is an antenna panel having mapping relationship with the second target port.

Optionally, the processor 700 is further configured to read the program in the storage 720, and perform the following steps: selecting a target beam-training signal resource set corresponding to a third target antenna panel from among beam-training signal resource sets configured by the network device for each of the target antenna panels, wherein each of the beam-training signal resource sets includes at least one beam-training signal resource, the third target antenna panel is any one of the at least two target antenna panels; transmission beam-training signal resources of the target beam training signal set using different analog beams on the third target antenna panel.

In some embodiments of the present disclosure, a computer readable storage medium is further provided. The computer readable storage medium has stored thereon a computer program. When the computer program is executed by a processor, the processor implements following steps: receiving Physical Uplink Shared Channel (PUSCH) scheduling information sent by a network device, wherein the PUSCH scheduling information includes first indication information and second indication information, and the first indication information is used to indicate a data layer included in a PUSCH, the second indication information is used to indicate a precoding matrix; according to the precoding matrix indicated by the second indication information, mapping the data layer of the PUSCH onto at least two target antenna panels for transmission, wherein the target antenna panels are antenna panels, for transmitting the PUSCH, among at least two antenna panels of the terminal.

When the program is executed by the processor, all implementations in the embodiments of the above data transmission method applied to the terminal side can be realized, and in order to avoid repetition, details thereof are not repeated here.

Figure 8:
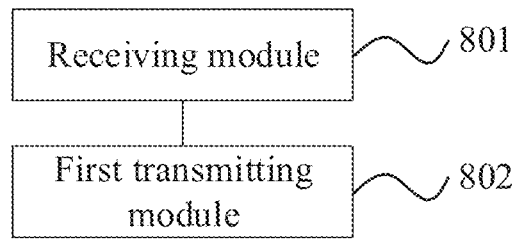
FIG. 8 is a schematic diagram of modules of a terminal according to an embodiment of the present disclosure.

As shown in FIG. 8, an embodiment of the present disclosure further provides a terminal. The terminal is configured with at least two antenna panels for uplink transmission. The terminal includes a receiving module 801 and a first sending module 802.

The receiving module 801 is configured to receive Physical Uplink Shared Channel (PUSCH) scheduling information sent by a network device, wherein the PUSCH scheduling information includes first indication information and second indication information, and the first indication information is used to indicate a data layer included in a PUSCH, the second indication information is used to indicate a precoding matrix. The first sending module 802 is configured to, according to the precoding matrix indicated by the second indication information, map the data layer included in the PUSCH onto at least two target antenna panels for transmission, wherein the target antenna panels are antenna panels, for transmitting the PUSCH, among the at least two antenna panels of the terminal.

The terminal of the embodiment of the present disclosure further includes a second transmitting module, a first acquiring module, and a third transmitting module.

The second transmitting module is configured to transmit a beam-training signal resource using analog beams on the at least two target antenna panels; the first acquiring module is configured to acquire a target transmission beam, indicated by a network device, corresponding to each of the target antenna panels, where the target transmission beam is acquired by the network device according to the beam-training signal resource; the third transmitting module is configured to transmit an uplink signal resource, for acquiring channel state information (CSI), on each of the target antenna panels by using a target transmission beam corresponding to the target antenna panel, wherein the PUSCH scheduling information is acquired by the network device according to the uplink signal resource.

In the terminal according to the embodiment of the present disclosure, the uplink signal resource is an uplink signal resource including K ports, K is a sum of the numbers of digital channels of the at least two target antenna panels, and the K ports are mapped to the at least two target antenna panels, K is a positive integer, and K is greater than or equal to L, and L is the number of data layers included in the PUSCH.

In the terminal according to the embodiment of the present disclosure, the third transmitting module includes a determining submodule and a first transmitting submodule.

The determining submodule is configured to determine a first target transmission beam corresponding to a first target port according to correspondence relationship between a port and a target transmission beam indicated by the network device. The first transmitting submodule is configured to transmit an uplink signal resource of the first target port on a first target antenna panel corresponding to the first target transmission beam.

In the terminal according to the embodiment of the present disclosure, the first transmitting module includes a first acquiring submodule, a second acquiring submodule, and a second transmitting submodule.

The first acquiring submodule is configured to perform a precoding operation on L data layers of the PUSCH according to the precoding matrix indicated by the second indication information, to acquire a transmission signal vector including K data layers, wherein, each data layer of the transmission signal vector corresponds to one of the ports. The second acquiring submodule is configured to acquire a second target port corresponding to a target data layer of the transmission signal vector. The second transmitting submodule is configured to transmit, on a second target antenna panel, the target data layer of the transmission signal vector using a second target transmission beam corresponding to the second target port, wherein the second target antenna panel is an antenna panel having mapping relationship with the second target port.

In the terminal according to the embodiment of the present disclosure, the second transmitting module includes a selecting submodule and a third transmitting submodule.

The selecting submodule is configured to select a target beam-training signal resource set corresponding to a third target antenna panel from among beam-training signal resource sets configured by the network device for each of the target antenna panels, wherein each of the beam-training signal resource sets includes at least one beam-training signal resource, the third target antenna panel is any one of the at least two target antenna panels. The third transmitting submodule is configured to transmit beam-training signal resources of the target beam training signal set using different analog beams on the third target antenna panel.

The terminal according to the embodiment of the present disclosure receives Physical Uplink Shared. Channel (PUSCH) scheduling information sent by a network device, wherein the PUSCH scheduling information includes first indication information and second indication information, and according to the precoding matrix indicated by the second indication information, the terminal maps the data layer of the PUSCH onto at least two target antenna panels for transmission, thereby achieving the purpose of simultaneously transmitting the data layer of the PUSCH from a plurality of antenna panels.

Figure 9:
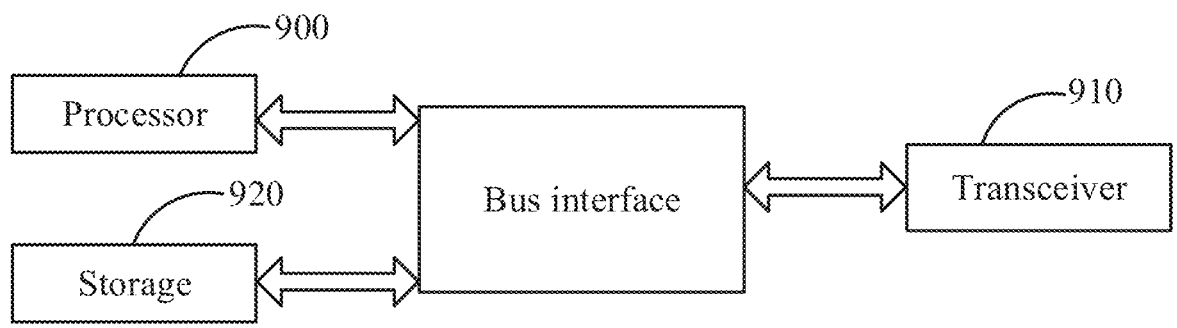
FIG. 9 is a structural block diagram of a network device according to an embodiment of the present disclosure.

As shown in FIG. 9, the embodiment of the present disclosure further provides a network device. The network device is specifically a base station. The base station includes a storage 920, a processor 900, a transceiver 910, a bus interface, and a computer program stored on the storage 920 and executable by the processor 900, the processor 900 is configured to read the program in the storage 920 to perform the following steps: acquiring uplink channel state information (CSI) according to an uplink signal resource sent by a terminal; acquiring physical uplink shared channel PUSCH scheduling information according to the channel state information CSI and sending the PUSCH scheduling information to the terminal, wherein the PUSCH scheduling information includes first indication information and second indication information, the first indication information is used to indicate a data layer included in the PUSCH, and the second indication information is used to indicate a precoding matrix.

In FIG. 9, a bus architecture may include any number of interconnected buses and bridges, particularly, various circuits such as one or more processors represented by the processor 900 and a storage represented by the storage 920 are linked together. The bus architecture may also link various other circuits, such as peripheral devices, voltage regulators, and power management circuits, etc. which are well known in the art, and therefore will not be described further herein. A bus interface provides an interface. The transceiver 910 can be a number of elements, including a transmitter and a transceiver, providing a unit for communicating with various other devices over a transmission medium. The processor 900 is responsible for managing a bus architecture and general processing, and the storage 920 can store data used by the processor 900 in performing operations.

Optionally, the processor 900 may further implement the following steps when executing the computer program: acquiring a beam-training signal resource sent by the terminal using analog beams on at least two target antenna panels, performing a beam-scanning operation on the beam-training signal resource, determining a target transmission beam corresponding to each of the target antenna panels and indicating the target transmission beam to the terminal.

Optionally, the uplink signal resource is an uplink signal resource including K ports, K is a sum of the numbers of digital channels of the at least two target antenna panels, and the K ports are mapped to the at least two target antenna panels, K is a positive integer, and K is greater than or equal to L, and L is the number of data layers included in the PUSCH.

Optionally, the processor 900 may further implement the following steps when executing the computer program: indicating correspondence relationship between the port and the target transmission beam to the terminal.

Optionally, the processor 900 may further implement the following steps when executing the computer program: indicating correspondence relationship between each port and a target transmission beam to a terminal; or indicating correspondence relationship between a port group and a target transmission beam to the terminal, wherein the K ports are divided into D port groups, and at least one target port group exists in the D port groups, the target port group is a port group including at least two ports, and D is a positive integer greater than 1.

In some embodiments of the present disclosure, a computer readable storage medium is further provided. The computer readable storage medium has stored thereon a computer program. When the computer program is executed by a processor, the processor implements following steps: acquiring uplink channel state information (CSI) according to an uplink signal resource sent by a terminal; acquiring physical uplink shared channel PUSCH scheduling information according to the channel state information CSI and sending the PUSCH scheduling information to the terminal, wherein the PUSCH scheduling information includes first indication information and second indication information, the first indication information is used to indicate a data layer included in the PUSCH, and the second indication information is used to indicate a precoding matrix.

When the program is executed by the processor, all implementations in the embodiments of the method applied to the network device side can be implemented, and are not repeated herein for sake of avoiding repetition.

Figure 10:
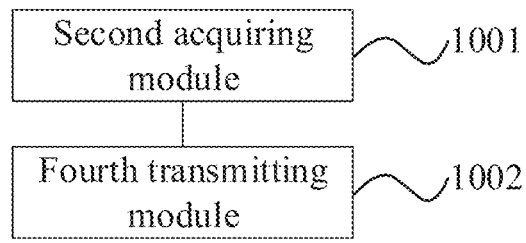
FIG. 10 is a schematic diagram of modules of a network device according to an embodiment of the present disclosure.

As shown in FIG. 10, an embodiment of the present disclosure further provides a network device. The network device includes: a second acquiring module 1001 and a fourth transmitting module 1002.

The second acquiring module 1001 is configured to acquire uplink channel state information (CSI) according to an uplink signal resource sent by a terminal.

The fourth transmitting module 1002 is configured to acquire physical uplink shared channel PUSCH scheduling information according to the channel state information CSI and send the PUSCH scheduling information to the terminal, wherein the PUSCH scheduling information includes first indication information and second indication information, the first indication information is used to indicate a data layer included in the PUSCH, and the second indication information is used to indicate a precoding matrix.

The network device according to the embodiment of the present disclosure further includes a third acquiring module and a determining module.

The third acquiring module is configured to acquire a beam-training signal resource transmitted by the terminal using analog beams on at least two target antenna panels. The determining module is configured to perform a beam-scanning operation on the beam-training signal resource, determine a target transmission beam corresponding to each of the target antenna panels and indicate the target transmission beam to the terminal.

In the network device of the embodiment of the present disclosure, the uplink signal resource is an uplink signal resource including K ports, K is a sum of the numbers of digital channels of the at least two target antenna panels, and the K ports are mapped to the at least two target antenna panels, K is a positive integer, and K is greater than or equal to L, and L is the number of data layers included in the PUSCH.

The network device according to the embodiment of the present disclosure further includes an indicating module.

The indicating module is configured to indicate correspondence relationship between the port and the target transmission beam to the terminal before the second acquiring module acquires the uplink channel state information (CSI) according to the uplink signal resource transmitted by the terminal.

In the network device according to the embodiment of the present disclosure, the indicating module is configured to indicate correspondence relationship between each port and a target transmission beam to the terminal; or, indicate correspondence relationship between a port group and a target transmission beam to the terminal, and the port group includes at least two ports, wherein the K ports are divided into D port groups, and at least one target port group exists in the port groups, the target port group is a port group including at least two ports, and D is a positive integer greater than 1.

The network device in the embodiment of the present disclosure acquires uplink channel state information (CSI) according to an uplink signal resource sent by a terminal, and acquires physical uplink shared channel PUSCH scheduling information according to the channel state information CSI and sends the PUSCH scheduling information to the terminal, so that the terminal maps, according to the precoding matrix indicated by the second indication information, data layers included in the PUSCH onto at least two target antenna panels for transmission, so as to achieve a purpose of simultaneously transmitting the data layers of a PUSCH by a plurality of antenna panels.

The embodiments of the present disclosure further provide a computer readable storage medium on which a computer program is stored. When the computer program is executed by a processor, the processor implements the various steps of the embodiments of the method as described above, and can achieve the same technical effect. Thus, detailed description thereof is not repeated herein for sake of avoiding repetition. The computer readable storage medium is a Read-Only Memory (ROM), a Random Access Memory (RAM), a magnetic disk or an optical disk.

Those of ordinary skills in the art will appreciate that elements and algorithm steps of examples described in connection with the embodiments disclosed herein can be implemented in electronic hardware, or a combination of computer software and electronic hardware. Whether these functions are performed in hardware or software depends on specific application and design constraints of the technical solutions. Those skilled in the art may use different methods to implement the described functionality for each particular application, but such implementations should not be considered to be go beyond the scope of the present disclosure. The electronic hardware may include, but is not limited to, electronic circuits, Application specific integrated circuits (ASICs), programmable logic devices, programmable processors, and the like.

It will be apparent to those skilled in the art that for convenience and brevity of description, reference may be made to corresponding procedures in the foregoing method embodiments for specific operating procedures of the systems, devices, and units described above, and detailed description will not be repeated here.

In several embodiments provided by the present disclosure, it should be understood that the disclosed systems, apparatus, and methods may be implemented in other ways. For example, the apparatus embodiments described above are merely illustrative, e.g., division to units is only a logical function division, and there may be other divisions when actually being implemented. For example, multiple units or components may be combined or may be integrated into another system, or some features may be omitted or not performed. Additionally, coupling or direct coupling or communication connection shown or discussed may be an indirect coupling or communication connection through some interfaces, devices or units, which may be in electrical, mechanical or other form.

In the various embodiments of the present disclosure, it is to be understood that values of serial numbers of the processes described above are not meant to be a sequential execution order, an order in which the processes are executed should be determined in terms of their functions and inherent logic, and should not constitute any limitation to an implementation process of the embodiments of the present disclosure.

The foregoing shows optional embodiments of the present disclosure and it should be noted that several modifications and embellishments may be made by those of ordinary skills in the art without departing from the principles of the present disclosure, these modifications and embellishments are also considered to be within the protection scope of the present disclosure.

What is claimed is:

1. A data transmission method performed by a terminal, the terminal being configured with at least two antenna panels for uplink transmission, the method comprising:
receiving Physical Uplink Shared Channel (PUSCH) scheduling information sent by a network device, wherein the PUSCH scheduling information comprises first indication information and second indication information, and the first indication information is used to indicate a data layer comprised in a PUSCH, the second indication information is used to indicate a precoding matrix;
mapping, according to the precoding matrix indicated by the second indication information, the data layer comprised in the PUSCH onto at least two target antenna panels for transmission, wherein the target antenna panels are antenna panels, for transmitting the PUSCH, among the at least two antenna panels of the terminal,
wherein before receiving the PUSCH scheduling information sent by the network device, the method further comprises:
transmitting a beam-training signal resource using analog beams on the at least two target antenna panels;
acquiring a target transmission beam, indicated by the network device, corresponding to each of the target antenna panels, wherein the target transmission beam is acquired by the network device according to the beam-training signal resource;
transmitting an uplink signal resource, for acquiring channel state information (CSI), on each of the target antenna panels by using a target transmission beam corresponding to the target antenna panel, wherein the PUSCH scheduling information is acquired by the network device according to the uplink signal resource.

2. The data transmission method according to claim 1, wherein the uplink signal resource is an uplink signal resource comprising K ports, K is a sum of the numbers of digital channels of the at least two target antenna panels, and the K ports are mapped to the at least two target antenna panels, K is a positive integer, and K is greater than or equal to L, and L is the number of data layers comprised in the PUSCH.

3. The data transmission method according to claim 2, wherein, transmitting the uplink signal resource, for acquiring the CSI, on each of the target antenna panels by using the target transmission beam corresponding to the target antenna panel, comprises:
determining a first target transmission beam corresponding to a first target port according to correspondence relationship between a port and a target transmission beam indicated by the network device;
transmitting an uplink signal resource of the first target port on a first target antenna panel corresponding to the first target transmission beam.

4. The data transmission method according to claim 2, wherein, mapping, according to the precoding matrix indicated by the second indication information, the data layer comprised in the PUSCH onto the at least two target antenna panels for transmission, comprises:
performing a precoding operation on L data layers of the PUSCH according to the precoding matrix indicated by the second indication information, to acquire a transmission signal vector comprising K data layers, wherein, each data layer of the transmission signal vector corresponds to one of the ports;
acquiring a second target port corresponding to a target data layer of the transmission signal vector;
transmitting, on a second target antenna panel, the target data layer of the transmission signal vector using a second target transmission beam corresponding to the second target port, wherein the second target antenna panel is an antenna panel having mapping relationship with the second target port.

5. The data transmission method according to claim 1, wherein transmitting the beam-training signal resource using the analog beams on the at least two target antenna panels, comprises:
selecting a target beam-training signal resource set corresponding to a third target antenna panel from among beam-training signal resource sets configured by the network device for each of the target antenna panels, wherein each of the beam-training signal resource sets comprises at least one beam-training signal resource, the third target antenna panel is any one of the at least two target antenna panels;
transmitting beam-training signal resources of the target beam training signal set using different analog beams on the third target antenna panel.

6. A data transmission method, performed by a network device, the method comprising:
acquiring uplink channel state information (CSI) according to an uplink signal resource sent by a terminal;
acquiring Physical Uplink Shared Channel (PUSCH) scheduling information according to the channel state information (CSI), and sending the acquired information to a terminal, wherein the PUSCH schedule information comprises first indication information and second indication information, the first indication information is used to indicate a data layer comprised in a PUSCH, and the second indication information is used to indicate a precoding matrix,
wherein, before acquiring the uplink CSI according to the uplink signal resource sent by a terminal, the method further comprises:
acquiring a beam-training signal resource sent by the terminal using analog beams on at least two target antenna panels;
performing a beam-scanning operation on the beam-training signal resource, determining a target transmission beam corresponding to each of the target antenna panels and indicating the target transmission beam to the terminal.

7. The data transmission method according to claim 6, wherein the uplink signal resource is an uplink signal resource comprising K ports, K is a sum of the numbers of digital channels of the at least two target antenna panels, and the K ports are mapped to the at least two target antenna panels, K is a positive integer, and K is greater than or equal to L, and L is the number of data layers comprised in the PUSCH.

8. The data transmission method according to claim 7, wherein, before acquiring the uplink CSI according to the uplink signal resource sent by the terminal, the method further comprises:
indicating correspondence relationship between a port and a target transmission beam to the terminal.

9. The data transmission method according to claim 8, wherein, indicating the correspondence relationship between the port and the target transmission beam to the terminal, comprises:
indicating correspondence relationship between each port and a target transmission beam to the terminal; or
indicating correspondence relationship between a port group and a target transmission beam to the terminal, wherein the K ports are divided into D port groups, and at least one target port group exists in the D port groups, the target port group is a port group comprising at least two ports, and D is a positive integer greater than 1.

10. A network device comprising a transceiver, a storage, a processor, and a program stored on the storage and executable by the processor, wherein when the processor executes the program, the processor implements steps of the data transmission method according to claim 6.

11. The network device according to claim 10, wherein the uplink signal resource is an uplink signal resource comprising K ports, K is a sum of the numbers of digital channels of the at least two target antenna panels, and the K ports are mapped to the at least two target antenna panels, K is a positive integer, and K is greater than or equal to L, and L is the number of data layers comprised in the PUSCH.

12. A terminal, configured with at least two antenna panels for uplink transmission, comprising a transceiver, a storage, a processor, and a program stored on the storage and executable by the processor, wherein when the processor executes the program, the processor implements the following steps:
receiving, by a transceiver, Physical Uplink Shared Channel (PUSCH) scheduling information sent by a network device, wherein the PUSCH scheduling information comprises first indication information and second indication information, and the first indication information is used to indicate a data layer comprised in a PUSCH, the second indication information is used to indicate a precoding matrix;
mapping, according to the precoding matrix indicated by the second indication information, the data layer comprised in the PUSCH onto at least two target antenna panels for transmission, wherein the target antenna panels are antenna panels, for transmitting the PUSCH, among the at least two antenna panels of the terminal,
wherein when the processor executes the program, the processor further implements the following steps:
transmitting a beam-training signal resource using analog beams on the at least two target antenna panels, before receiving the PUSCH scheduling information sent by the network device;
acquiring a target transmission beam, indicated by the network device, corresponding to each of the target antenna panels, wherein the target transmission beam is acquired by the network device according to the beam-training signal resource;
transmitting an uplink signal resource, for acquiring channel state information (CSI), on each of the target antenna panels by using a target transmission beam corresponding to the target antenna panel, wherein the PUSCH scheduling information is acquired by the network device according to the uplink signal resource.

13. The terminal according to claim 12, wherein the uplink signal resource is an uplink signal resource comprising K ports, K is a sum of the numbers of digital channels of the at least two target antenna panels, and the K ports are mapped to the at least two target antenna panels, K is a positive integer, and K is greater than or equal to L, and L is the number of data layers comprised in the PUSCH.

14. The terminal according to claim 13, wherein when the processor executes the program, the processor further implements the following steps:
determining a first target transmission beam corresponding to a first target port according to correspondence relationship between a port and a target transmission beam indicated by the network device;
transmitting an uplink signal resource of the first target port on a first target antenna panel corresponding to the first target transmission beam.

15. The terminal according to claim 13, wherein when the processor executes the program, the processor further implements the following steps:
performing a precoding operation on L data layers of the PUSCH according to the precoding matrix indicated by the second indication information, to acquire a transmission signal vector comprising K data layers, wherein, each data layer of the transmission signal vector corresponds to one of the ports;
acquiring a second target port corresponding to a target data layer of the transmission signal vector;
transmitting, on a second target antenna panel, the target data layer of the transmission signal vector using a second target transmission beam corresponding to the second target port, wherein the second target antenna panel is an antenna panel having mapping relationship with the second target port.

16. The terminal according to claim 12, wherein when the processor executes the program, the processor further implements the following steps:
selecting a target beam-training signal resource set corresponding to a third target antenna panel from among beam-training signal resource sets configured by the network device for each of the target antenna panels, wherein each of the beam-training signal resource sets comprises at least one beam-training signal resource, the third target antenna panel is any one of the at least two target antenna panels;
transmitting beam-training signal resources of the target beam training signal set using different analog beams on the third target antenna panel.

* * * * *